Nov. 5, 1929.                    W. W. HAMEL                    1,734,575
                        ADVERTISING OR DISPLAY DEVICE
                        Filed Oct. 25, 1926         3 Sheets-Sheet 3
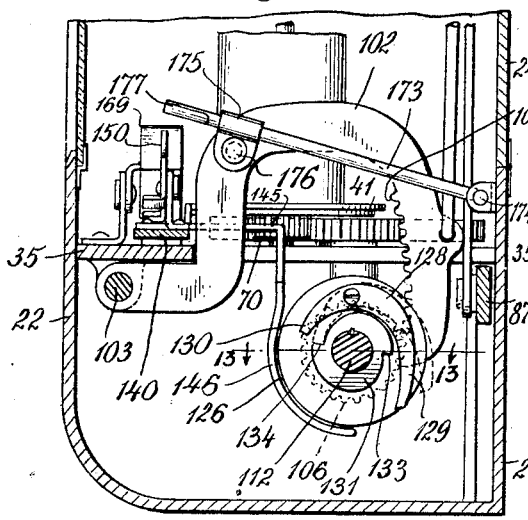
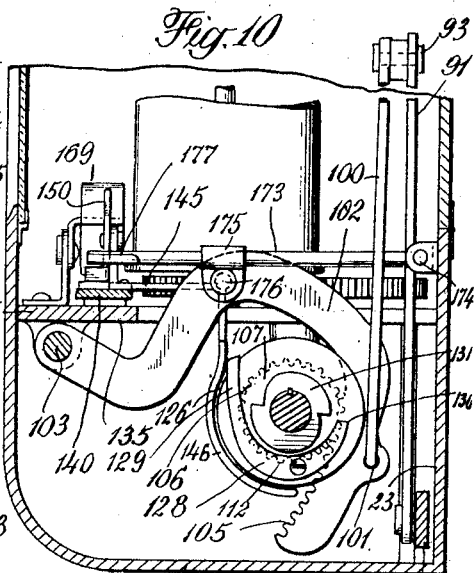
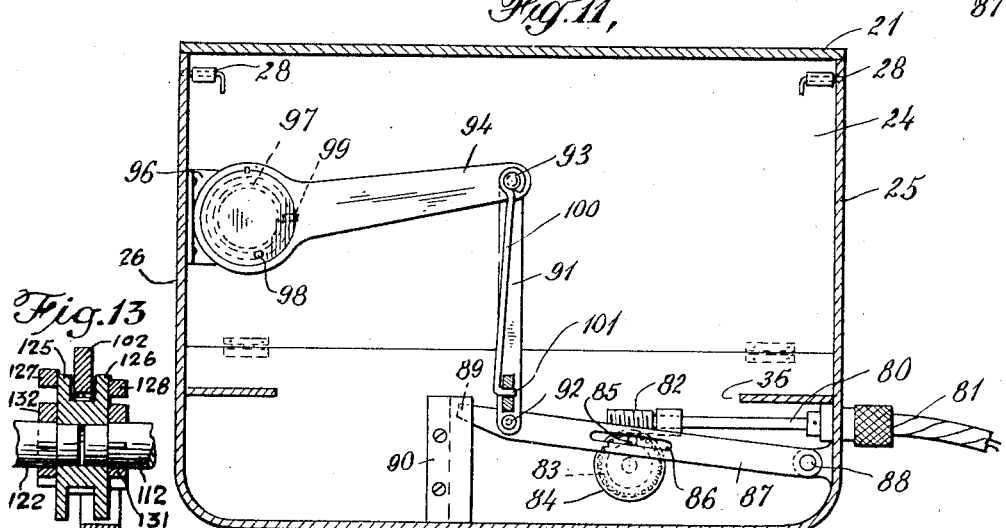
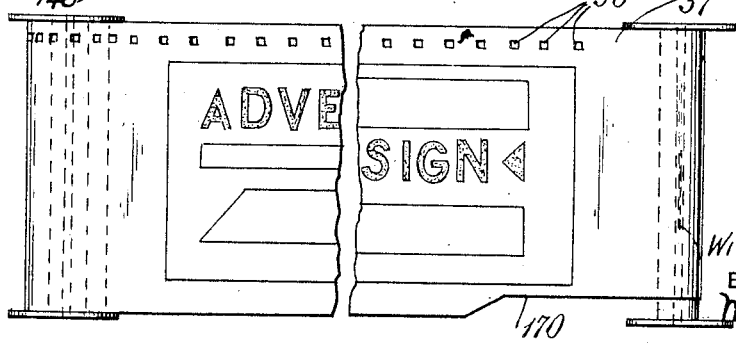
INVENTOR
William W. Hamel
BY
Marshall & Hawley
ATTORNEYS Patented Nov. 5, 1929

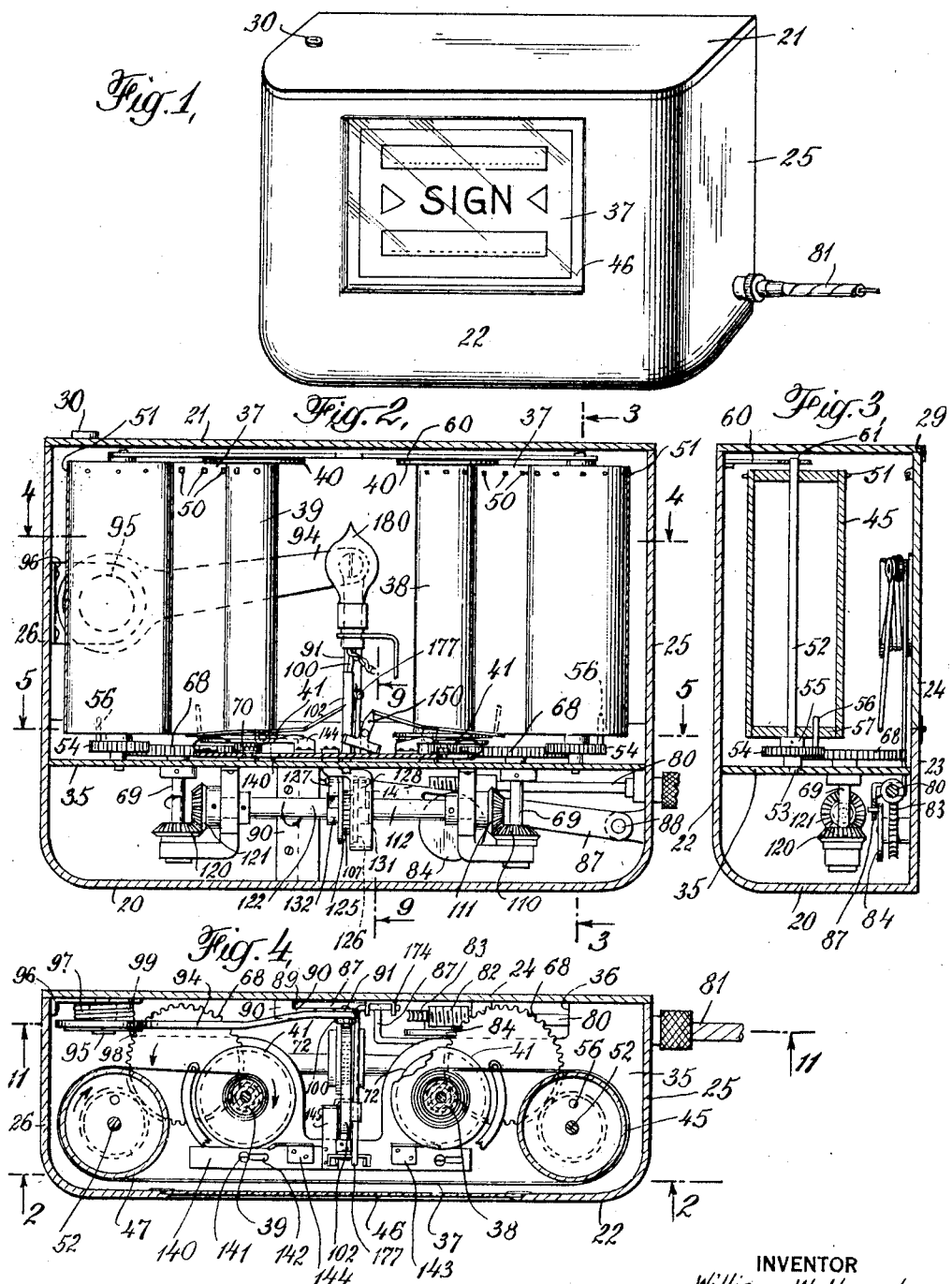

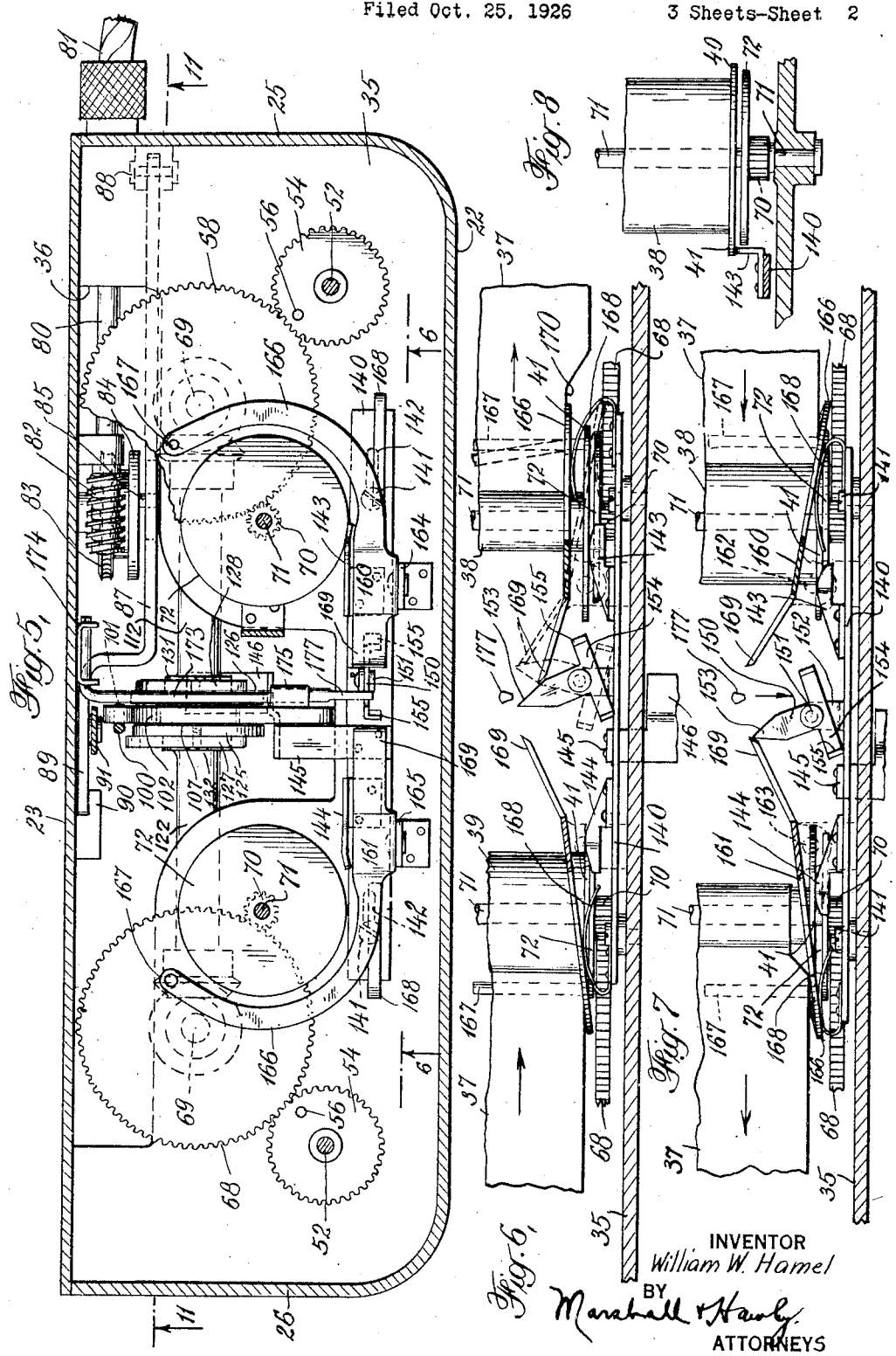

1,734,575

UNITED STATES PATENT OFFICE

WILLIAM W. HAMEL, OF NEW YORK, N. Y., ASSIGNOR TO ADVERTISING SAMPLERS, INC., OF WILMINGTON, DELAWARE, A CORPORATION OF DELAWARE

ADVERTISING OR DISPLAY DEVICE

Application filed October 25, 1926. Serial No. 143,854.

This invention relates to advertising or display devices and particularly to devices of this character adapted for use in vehicles, such as taxicabs, busses and so forth and also adapted for changeable window displays.

At the present time there are many thousand taxicabs, busses and similar public conveyances in this country and such vehicles offer an enormous field for placing advertising matter before the public.

As is well known, advertising cards are displayed in public conveyances, such as busses and railway cars, but the number of advertisements that can be so displayed is limited by the space available for that purpose. Furthermore, in vehicle, such as taxicabs, there is not sufficient available space for such advertising display cards.

This invention has for its salient object to provide an advertising or display device so constructed and arranged that advertisements can be intermittently displayed or displayed one at a time before observers or before the passengers in the vehicle.

Another object of the invention is to provide an advertising device of the character described having a strip of advertisements thereon and so constructed and arranged that the strip will be fed step by step or intermittently before the passenger or observer and will be automatically reversed when it has been entirely fed from one reel to the other.

Another object of the invention is to provide an advertising or display device of the character specified so constructed and arranged that the strip and reel can be easily and quickly removed and replaced.

Another object of the invention is to provide simple and practical driving connections for a device of the character specified so constructed and arranged that the strip or web will be uniformly fed and will be maintained taut regardless of the amount wound on either of the strip rolls.

Another object of the invention is to provide a device of the character specified having driving connections so constructed that the direction of rotation of the drive shaft will not affect the direction of movement of the advertising strip.

Another object of the invention is to provide driving mechanism for a device of the character specified so constructed and arranged that the drive will be supplemented by a booster device during the working portion of the cycle of operation.

Another object of the invention is to provide a device of the character specified so constructed and arranged that it will operate efficiently and quickly, will not get out of order and will require a minimum expenditure of power.

Further objects of the invention will appear from the following specification taken in connection with the drawings, which form a part of this application, and in which Fig. 1 is an elevational view in perspective, illustrating a device constructed in accordance with the invention;

Fig. 2 is a sectional elevation taken substantially on line 2—2 of Fig. 4;

Fig. 3 is a sectional elevation taken substantially on line 3—3 of Fig. 2;

Fig. 4 is a sectional elevation taken substantially on line 4—4 of Fig. 2, certain parts being omitted and broken away for the sake of clearance;

Fig. 5 is an enlarged sectional elevation taken substantially on line 5—5 of Fig. 2;

Fig. 6 is a sectional elevation taken substantially on line 6—6 of Fig. 5;

Fig 7 is a sectional elevation similar to Fig. 6, but showing the parts at a different period in the cycle of operation of the mechanism;

Fig. 8 is a detail sectional elevation, illustrating the manner in which one of the strip rolls is lifted clear of its driving disk;

Fig. 9 is a detail sectional elevation taken substantially on line 9—9 of Fig. 2;

Fig. 10 is a view similar to Fig. 9, but showing the parts at a different period in the cycle of operation thereof;

Fig. 11 is a sectional elevation taken substantially on line 11—11 of Fig. 4;

Fig. 12 is an elevational view showing the strip rolls and strip secured thereto; and Fig. 13 is a detail sectional elevation through the central driving disk and shafts driven thereby taken substantially on line 13—13 of Fig. 9.

The invention briefly described consists of a machine for intermittently displaying pictures, signs, advertising material or any other desired matter. The device comprises a pair of strip rolls and means for guiding the strip across the front of the machine whereby the matter displayed on the strip can be observed through an opening or window in the front of the machine. When the machine is operating one of the strip rolls will be driven to wind up the strip and the other strip roll will be idle so that the strip can be unwound therefrom. Means is provided for automatically disconnecting the drive from one of the strip rolls and connecting the drive to the other strip roll when the strip has been unwound from the wind-off or discharge roll. The drive is so connected to the strip rolls and is operated at such a speed that the strip will be maintained taut regardless of the amount wound on the receiving or take-up roll.

The drive to the strip rolls is intermittent so that the strip will be fed a predetermined distance to display one advertisement or picture or a single unit of matter and will then remain at rest for a predetermined period of time and thereafter will be again led to display another advertising legend or picture. In the cycle of operation, therefore, there may be said to be a working stroke and an idle stroke and the drive is so constructed that during the idle stroke, power is stored in a booster device to assist in winding the strip during the working stroke.

Various novel features are incorporated in the roll support and driving mechanism, automatic shifting mechanism and in the general construction of the device and these will be brought out in more detail in the following specification.

*Strip roll mounting and driving connections therefor*

In the particular embodiment of the invention illustrated, the device is mounted in a cabinet having a bottom 20, top 21, front wall 22, back wall consisting of hinged sections 23 and 24 and end walls 25 and 26. The back wall section 23 is fixedly secured to the bottom and end walls and the section 24 hinged to the fixed section 23 is secured by means of pins 28 carried by the section 24 and engaging openings in the end walls 25 and 26. The top wall 21 is hinged as shown at 29 to the back wall section 24 and a lock 30 secures the top 21 in closed position.

A supporting plate or partition 35 is mounted in the lower end of the cabinet and is rigidly connected in any suitable manner to the front, end and back walls. This partition has a cut-away portion or recess 36 along the back edge thereof to permit the passage of certain driving connections hereinafter described.

A web or strip 37 is connected at its opposite ends to spools 38 and 39 having flanges or disks 40 and 41 at the upper and lower ends thereof. The web is led from the spool 38 around a drum 45 and thence across the front of the cabinet in back of a window 46 and around a drum 47 to the spool 39.

The web or strip is provided along one edge thereof with a series of alined perforations 50 adapted to receive peripheral lugs 51 mounted on the drums 45 and 47 adjacent the upper ends thereof.

The drums 45 and 47 are mounted on spindles 52 which in turn are mounted at their lower ends as shown at 53 in the plate or partition 35. Each spindle 52 has a gear 54 secured thereto and intermediate the gear on the bottom of the drum there is mounted a collar or washer 55. Each gear has a pin 56 secured thereto and extending upwardly therefrom and the bottom 57 of each drum has an aperture positioned to receive the pin 56. In order to further support the spindles 52 and to insure the proper spaced relation of the drums 45 and 47, a reinforcing strip or frame 60 is provided with openings 61 which receive the upper ends of the spindles 52.

Each of the gears 54 meshes with a gear 68 secured to the upper end of a shaft 69 which extends upwardly through the partition 35. The shafts 69 are driven in a manner hereinafter described.

Each of the gears 68 also meshes with a gear 70 carried by a spindle 71 supported on the partition 35.

Each of the spindles 71 has secured thereto above the gear 70 a disk 72 on which is adapted to rest the lower flange or end 41 of the spool carried by the spindle 71. Attention is called to the fact that the driving connection to the spool is made through the frictional engagement of the flange at the lower end of the spool with the disk and, as will be later explained, one of the spools has its lower flange in driving engagement with the disk coacting therewith when the other spool has its lower flange lifted out of engagement with its disk. The manner of effecting this elevation of one of the spools will be hereinafter described.

The friction drive between the spool and disk also forms a slip driving connection and the driving mechanism for the shafts 69 is so designed that the gears 70 and disks 72 will be driven faster than the take-up on the receiving spool, thus insuring the maintaining of the strip taut as it passes across the front of the machine behind the window.

Power operating mechanism

The operating mechanism for winding the spools is mounted below the partition 35. The power is derived from a shaft 80 which is connected by a flexible shaft 81 to any suitable source of power. For instance, when the device or machine is used in a motor bus or taxicab, the shaft can be connected to be driven by the transmission shaft or by one of the wheels of the vehicle.

The shaft 80 has secured to one end thereof a worm 82 which meshes with a worm gear 83 carried by the rear wall section 23. A disk 84 is secured to the hub of the worm gear 83 and has projecting laterally therefrom a crank pin or stud 85. The stud 85 extends into an elongated slot 86 formed in a lever 87 mounted on a fixed pivot 88 carried by the end wall 25. The opposite end 89 of the lever 87 is offset from the main portion of the lever and is disposed between a guide 90 and the rear wall section 23. A link 91 is pivoted at 92 to the lever 87 and at its upper end is pivoted at 93 to an arm 94 which in turn is mounted on a pivot 95 carried by a bracket 96 secured to the end wall 26.

A spring 97 is secured at one end 98 to the arm 94 and is secured at its opposite end 99 to the bracket 96. Thus as the arm 94 moves downwardly, the spring is tightened or tensioned.

A link 100 is pivoted on the pivotal connection 93 between the link 91 and arm 94 and has an offset lower end or hook 101 engaging a rack 102 pivoted at 103 to lugs depending from the partition or supporting plate 35.

The rack 102 has rack teeth 105 which mesh with teeth 106 of a gear 107.

The shaft 69 at the right in Fig. 2 is connected by a bevel gear connection 110, 111 to a shaft 112 and the shaft 69 at the left in Fig. 2 is connected by a bevel gear connection 120, 121 to a shaft 122.

The gear 107 is freely oscillatable on an axis alined with the axes of the shafts 112 and 122 and means is provided for operatively connecting this gear during its movement in one direction by the pivoted rack 102 to one of the shafts 112 or 122.

The gear 107 has secured to the opposite faces thereof a pair of disks 125, 126. The disks 125 and 126 have pivoted thereon respectively pawls 127, 128. It will be noted that these pawls have elongated tails 129 which overbalance the opposite or tooth ends 130 of the pawls.

The shafts 112 and 122 have secured thereto respectively ratchets 131, 132 having teeth or depressed portions 133 and 134 adapted to be engaged by the teeth 130 of the pawls as the disks 125 and 126 are rotated by the gear 107 in one direction.

It will be obvious that the gear 107, the disks 125 and 126 and the pawls 127 and 128 will be rotated alternately in opposite directions as the rack 102 is oscillated up and down about its pivot 103.

Drive control and automatic reversing mechanism.

In the operation of the device, one of the strip rolls is winding up the strip and the other strip roll is discharging or unwinding the strip. For this reason, only one of the strip rolls should be driven at any one time and when the strip has been unwound from one of the rolls, the drive should reverse, causing the empty roll to wind up or take up the strip and the full roll to discharge or wind off the strip. This is accomplished in the following manner.

The control mechanism is carried by an elongated plate 140 slidably mounted on the partition 35 and having a pin and slot connection 141, 142 therewith. The plate 140 has fixedly secured thereto a pair of upwardly extending lugs 143, 144 adapted to alternately engage the flanges 41 of the spools 38 and 39. When the plate 140 is shifted to the right as shown in Figs. 2, 4, 5 and 6, the spool 38 will be lifted by the lug 143 out of frictional driving engagement with the disk 72.

The plate 140 also has secured thereto and extending laterally therefrom a strip 145 which in turn has secured to the free end thereof an offset, downwardly extending curved portion 146. The portion 146 is adapted to engage the tail 129 of one of the pawls 127 or 128 and by engaging the tail, to prevent the tooth end 130 of the pawl from engaging the recess or tooth in the ratchet 131 or 132. The function of the curved portion 146 is clearly shown in Fig. 10. It will be obvious that when the plate 140 is positioned to dispose the curved portion 146 of the strip 145 in position to prevent one of the pawls from engaging and driving its cam or ratchet that the shaft connected to said cam or ratchet or on which the cam or ratchet is mounted, will not be driven.

The automatic shift for the plate 140 is accomplished in the following manner. A member 150 is pivotally mounted at 151 in lugs 152 secured to the central portion of the plate 140. The member 150 has a beveled upper end 153 and has a T-shaped lower end 154. The opposite ends of the T-shaped head 154 are bent laterally as shown at 155.

The position of the member 150 is controlled by a pair of feelers or levers 160, 161 pivoted respectively at 162 and 163 to lugs 164 and 165 carried by the partition 35. The levers or feelers 160, 161 have rearwardly extending portions 166 and studs or pins 167 project upwardly from the rear ends thereof. The curved extensions 166 as shown particularly in Fig. 4 project beneath the portions of the strip 37 disposed between the spools 38, 39 and the drums 45, 47. A spring 168 is disposed beneath each of the levers 160, 161 and tends to lift the lever about its pivot in a direction to cause the short end 169 thereof to be depressed.

The levers are normally held in the position shown in Fig. 7 or, in other words, with the short ends 169 elevated. They are held in this position against the pressure of the springs 168 by the lower edge of the strip 37. The strip, however, has a portion of its lower edge adjacent each end thereof cut away or recessed as shown at 170 in Fig. 6. When the strip is unwound sufficiently to permit one of the levers or feelers, such as the lever or feeler 160 in Fig. 6 to enter the recess, this lever will be tilted on its pivot 162 and the short end 169 thereof will engage the beveled upper end 153 of the member 150 and tilt this member on its pivot from the dotted line position shown in Fig. 6 to the full line position shown therein.

The shifting of the plate 140 and the parts carried thereby is accomplished by means of a rod 173 pivoted to a bracket 174 carried by the section 23 of the rear wall of the casing. The rod 173 is slidably mounted in a loop or keeper 175 pivotally mounted at 176 on the rack 102. The free end 177 of the rod 173 is adapted to engage one edge or the other of the beveled upper end 153 of the member 150 when the member 150 is tilted by one of the feelers or levers 160 or 161 as shown in Fig. 6. It will be seen that the rod 173 will be moved upwardly and downwardly as the rack moves upwardly and downwardly and normally the rod 173 performs no function. However, when the strip is substantially unwound from one of the spools and the pivoted lever or keeper can enter the recessed or cut-away portion 170 of the lower edge of the strip, then the lever will be raised by the spring 168 controlling the lever, the member 150 will be tilted about its pivot as shown in Fig. 6 and upon the next downward movement of the rod, the rod will engage the beveled upper end 153 of the member 150 and force the plate 140 and the parts carried thereby to the right or to the left as the case may be. When the plate is shifted to the right or to the left, one of the lugs 143, 144 will move away from the flange 40 at the lower end of one of the spools and the other lug will move beneath the corresponding flange of the other spool and raise that spool out of engagement with its driving disk. At the same time, the curved portion 146 of the strip 145 will move from the position in which it coacts with one of the pawls to hold this pawl out of operative position, to the position in which it will coact with the other pawl, permitting the first pawl to move into operative position and to drive the shaft controlled thereby.

A lamp 180 is preferably mounted within the cabinet or casing behind the window 46 in order to illuminate the advertisements or other matter carried by the strip 37.

Résumé of operation

Assuming that the shaft 81 is connected to a suitable source of power, the shaft 80 will be rotated and through the worm drive connections will rotate the disk 84 causing the lever 87 to oscillate upwardly and downwardly about its pivot 88. When the lever moves downwardly, it will cause the arm 94 to also move downwardly, thus tightening the spring 97. Furthermore, as the lever 87 moves downwardly, the rack 103 will also move downwardly about its pivot 103 and will rotate the gear 107, disks 125 and 126 carried thereby and pawls 127, 128 carried by the disks. During this movement, the strip 37 is held stationary, thus displaying one of the advertising signs or other matter. However, when the lever 87 moves upwardly, the rack 102 will also move upwardly and one of the pawls 127 or 128 will be caused by its overweighted tail 129 to engage one of the teeth or recesses 133 or 134 of one of the ratchets 131, 132. Since the gear 107 will be rotated by the upward movement of the rack 102, the pawl which is permitted to engage its ratchet tooth will cause the shaft controlled thereby to be rotated. The position of the plate 140 will determine which of the shafts 112, 122 will be driven. For instance, in Fig. 2 the curved portion 146 of the strip 145 prevents the pawl 128 from engaging its ratchet 131 and the other pawl 127 is permitted to engage its ratchet or cam 132 and drive the shaft 122.

The shaft 122 through the bevel gear connection 120, 121 will drive the left hand shaft 69, thus rotating the gear 68 and this gear by reason of its meshing with gears 54 and 70 will cause these gears to rotate. The rotation of the gear 70 will also rotate the disk 72 connected thereto and since the spool mounted above the disk at the left in Fig. 2 is not raised out of engagement with the disk but engages the disk, the spool will also be rotated by its frictional engagement with the disk. It will be evident from the gearing connections shown particularly in Fig. 5 that the disk 72 will be driven faster than the drum 47 which is driven by the gear 54 and since the friction drive between the disk 72 and the spool provides a slip drive connection, tension will always be maintained on the strip.

As above described, when one of the spools is substantially unwound as, for instance, the spool 38 in Fig. 6, the feeler or lever 160 can tilt on its pivot, thus tilting the member 150 and so positioning this member that it will be engaged by the rod 173 upon the next downward movement of the rod. As the rod moves downwardly and engages the member 150, this member and the plate 140 and other parts carried thereby will be shifted to the left, permitting the spool 38 to drop into engagement with its driving disk and raising the spool 39 out of engagement with its disk. At the same time, the curved member 146 which is carried by the plate 140 will be shifted from its coactive position with one of the pawls to a position in which it will coact with the other pawl to hold the pawl out of operative position.

It will be noted that during the operation of the machine, the downward movement of the rack 102 accomplishes no driving function but merely winds up or tightens the spring 97. The spring in turn assists the drive during the upward movement of the rack which causes the rotation of the spool. Furthermore, it should be noted that the direction of rotation of the drive shaft 80 will not affect the direction of feeding of the strip from one spool to the other and this is particularly advantageous since in case the drive shaft is connected to the wheels of a motor bus or taxicab and is driven thereby, the reversing or backing of the machine will not reverse the direction of drive of the strip.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A display device comprising a casing, a pair of spools mounted therein, a strip secured to said spools, a separate driving disk associated with each spool and adapted to frictionally drive said spool, and drive control mechanism for said spools having means engageable with said spools to hold one or the other of said spools out of frictional engagement with its driving disk.

2. A display device comprising a casing, a pair of spools mounted therein, a strip secured to said spools, a separate driving disk associated with each spool and adapted to frictionally drive said spool, drive control mechanism for said spools having means engageable with said spools to hold one or the other of said spools out of frictional engagement with its driving disk, and means for automatically shifting said control mechanism when the strip is unwound from one of said spools.

3. A display device comprising a casing, a pair of spools mounted therein, a strip secured to said spools, a separate driving disk associated with each spool and adapted to frictionally drive said spool, drive control mechanism for said spools having means engageable with said spools to hold one or the other of said spools out of frictional engagement with its driving disk and means controlled by the strip for automatically shifting said control mechanism when the strip is unwound from one of said spools.

4. A display device comprising a casing, a pair of spools mounted therein, a strip secured to said spools, a separate driving disk associated with each spool and adapted to frictionally drive said spool, drive control mechanism for said spools having means engageable with said spools to hold one or the other of said spools out of frictional engagement with its driving disk, and driving mechanism for intermittently driving the disk disposed in driving engagement with its spool.

5. A display device comprising a casing, a pair of spools mounted therein, a strip secured to said spools, a separate driving disk associated with each spool and adapted to frictionally drive said spool, drive control mechanism for said spools having means engageable with said spools to hold one or the other of said spools out of frictional engagement with its driving disk, driving mechanism for intermittently driving the disk disposed in driving engagement with its spool, and means for automatically shifting said driving mechanism to drive the other disk when the spool associated with the inactive disk is empty.

6. A display device comprising a casing, a pair of spools mounted therein, a strip secured to said spools, a drum associated with each spool and having driving engagement with said strip, driving connections for each drum, a disk for engaging and driving each spool, driving connections for said disks constructed and arranged to drive said disks faster than the drums and means for shifting said spools into and out of driving engagement with said disks.

7. A display device comprising a casing, a pair of spools, a strip secured at its ends to said spools, a drum associated with each spool and directly engaging said strip and two sets of driving connections, each set being adapted to drive one spool and its associated drum, means operative to drive either of said sets of driving connections, and means for automatically shifting said drive from one set of driving connections to the other set when the strip is substantially unwound from the spool of one set, said shifting means including shift control feelers engaging the edge of the strip, the edge of the strip at each end thereof being so constructed and arranged as to cause the feelers to shift the drive.

8. A display device comprising a casing, a pair of spools, a strip secured at its ends to said spools, a drum associated with each spool and directly engaging said strip and two sets of driving connections, each set being adapted to drive one spool and its associated drum, and means including selectively operatable pawls carried by a single driving element operative to drive either of said sets of driving connections.

9. A display device comprising a casing, a pair of spools, a strip secured at its ends to said spools, a drum associated with each spool and directly engaging said strip and two sets of driving connections, each set being adapted to drive one spool and its associated drum, a single rotatable member, means including a pair of selectively operatable pawls carried by said rotatable member for driving the sets of driving connections, and control means for holding one or the other of said pawls in inoperative position.

10. A display device comprising a casing, a pair of spools, a strip secured at its ends to said spools, a drum associated with each spool and directly engaging said strip and two sets of driving connections, each set being adapted to drive one spool and its associated drum, means including a pawl for driving each set of driving connections, control means including a member engageable with said pawls, one at a time for holding one or the other of said pawls in inoperative position, and means to automatically shift said control means from one pawl to the other when the spool being unwound is substantially empty.

11. A display device comprising a casing, a pair of spools, a strip secured at its ends to said spools, a drum associated with each spool and directly engaging said strip and two sets of driving connections, each set being adapted to drive one spool and its associated drum, and means, including an oscillatable rack, a pinion oscillatable thereby and pawls carried by said pinion, said pawls being operatable selectively for driving either one of said sets of driving connections.

12. A display device comprising a casing, a pair of spools, a strip secured at its ends to said spools, driving connections for each of said spools an intermittently rotatable gear and selectively operable pawls carried by the gear and operative during the rotation of the gear in one direction to drive one or the other of said sets of driving connections.

13. A display device comprising a casing, a pair of spools mounted therein, a strip secured to said spools, a driving disk adapted to frictionally drive each spool, a drum associated with each spool and engaging said strip, a driving connection for each drum, mechanism operative to drive either spool driving disk and the drum associated with said spool and control mechanism for said drive mechanism operative to hold one of said spools out of operative driving relation to its disk when the drive to said spool disk and to the drum associated with said spool is disconnected.

14. A display device comprising a casing, a display strip mounted therein, a spool secured to each end of said strip, a continuously operating drive shaft, an oscillatable member driven by said shaft, driving connections for each of said spools, means including a single pinion meshing with said oscillatable member for operatively connecting either of said driving connections to said oscillatable member, said pinion being alternately rotatable in opposite directions by said oscillatable member and control means for said means constructed and arranged to render one of said operative connecting means inoperative while the other connecting means is operating.

15. A display device comprising a casing, a display strip mounted therein, a spool secured to each end of said strip, a continuously operating drive shaft, an oscillatable rack member driven by said shaft, and means including a single pinion meshing with said rack and members carried by said pinion adapted to connect said oscillatable member to drive either of said spools, said means being operative only during the oscillation of said member in one direction.

16. A display device comprising a casing, a display strip mounted therein, a spool secured to each end of said strip, a continuously operating drive shaft, an oscillatable rack member driven by said shaft, means including a single pinion meshing with said rack and members carried by said pinion adapted to connect said oscillatable member to drive either of said spools, said means being operative only during the oscillation of said member in one direction, and control means adapted to maintain the drive between said member and one spool inoperative while the drive to the other spool is operative.

17. A display device comprising a casing, a display strip mounted therein, a spool secured to each end of said strip, a continuously operating drive shaft, two sets of operative driving connections, each set being operative to feed said strip in one direction, means including a reciprocable member for operatively connecting one or the other of said sets of driving connections to said drive shaft, and means including feelers engaging the edge of the strip to automatically shift said drive from one set of driving connections to the other when one spool is empty the edge of the strip at each end thereof being so constructed and arranged as to cause the feelers to shift the drive.

18. A display device comprising a casing, a pair of spools, a strip secured at its ends to said spools, driving connections for each of said spools, said connections including selectively operatable shafts, oscillatable means operative during its oscillations in one direction to drive one or the other of said shafts and sets of driving connections, and means operable by said oscillatable means during its non-operative movement to store up power for use in assisting to operate said oscillatable means during its operative movement.

19. A display device comprising a casing, a pair of spools, a strip secured at its ends to said spools, driving connections for each of said spools, said connections including selectively operatable shafts, oscillatable means including a vertically oscillatable member operative during its oscillation in one direction to drive one or the other of said shafts and sets of driving connections, and means operable by said oscillatable member during its downward movement to store up power for aiding the upward movement of said member.

20. A display device comprising a casing, a pair of spools, a strip secured at its ends to said spools, driving connections for each of said spools, oscillatable means including a vertically oscillatable member operative during its oscillation in one direction to drive one or the other of said sets of driving connections, means operable by said oscillatable member during its downward movement to store up power for aiding the upward movement of said member, said last named means including a pivoted arm, a spring connected at one end to said arm and having its other end fixed, and a link connecting said arm and said member, said spring being so arranged that the downward movement of said member and arm will tighten the spring.

21. A display device comprising a casing, a pair of spools, a strip secured at its ends to said spools, driving connections for each of said spools, said connections including a pair of selectively operatable shafts, means adapted to intermittently drive one or the other of said shafts and sets of driving connections, and means connected to said driving means for storing up power during the period of rest of said driving connections, said power being available to assist the drive means during the driving portion of its operation.

22. A display device comprising a casing, a display strip mounted therein and having a recess at the edge thereof adjacent each end thereof, a spool secured to each end of the strip, a drive shaft, a set of operative driving connections adapted to connect said drive shaft to drive either spool, and means including feelers having portions adapted to enter the recesses in the edge of the strip for controlling said driving connections and the direction of drive of the strip.

23. A display device comprising a casing, a display strip mounted therein and having a recess at the edge thereof adjacent each end thereof, a spool secured to each end of said strip, a continuously operating drive shaft, two sets of operative driving connections, each set being operative to feed said strip in one direction, means for operatively connecting one or the other of said sets of driving connections to said drive shaft, and means controlled by the strip to automatically shift said drive from one set of driving connections to the other when one spool is empty, said means including feelers having portions adapted to enter the recesses in the edges of the strip for controlling said driving connections and the direction of drive of the strip.

24. A display device comprising a casing, a pair of spools mounted therein, a strip secured to said spools, means for feeding said strip from either spool to the other spool, a continuously operating drive shaft and operative connections between said shaft and said feeding means adapted to impart a step by step feed to the strip, said operative connections including a pair of selectively operatable pawls, pawl control means for holding one or the other of said pawls inoperative, and means controlled by the record strip for shifting said pawl control means.

25. A display device comprising a casing, a pair of spools mounted therein, a strip secured to said spools, means for feeding said strip from either spool to the other spool, a continuously operating drive shaft and operative connections between said shaft and said feeding means adapted to impart a step by step feed to the strip, said operative connections including a pair of selectively operatable pawls, pawl control means for holding one or the other of said pawls inoperative, and means including feelers controlled by the record strip for shifting said pawl control means.

26. A display device comprising a casing, a display strip mounted therein and having a recess at the edge thereof adjacent each end thereof, a spool secured to each end of the strip, a drive shaft, a set of operative driving connections adapted to connect said drive shaft to drive either spool, and means including feelers having portions adapted to enter the recesses in the edges of the strip and a tiltable control member engageable by said feelers for controlling said driving connections and the direction of drive of the strip.

27. A display device comprising a casing, a display strip therein, a spool secured to each end of the strip, means for feeding the strip from either spool to the other spool, said means including a pair of selectively operatable pawls, means for holding one or the other of said pawls inoperative, and automatically operatable means for shifting said pawl holding means from coactive relation with one pawl to coactive relation with the other pawl when one spool is full.

28. A display device comprising a casing, a display strip therein, a spool secured to each end of the strip, means for feeding the strip from either spool to the other spool, said means including a pair of selectively operatable pawls, single means for holding one or the other of said pawls inoperative, and automatically operatable means for shifting said pawl holding means from coactive relation with one pawl to coactive relation with the other pawl when one spool is full.

29. A display device comprising a casing, a display strip therein, a spool secured to each end of the strip, means for feeding the strip from either spool to the other spool, said means including a pair of selectively operatable pawls, means for holding one or the other of said pawls inoperative, and automatically operatable means including feelers controlled by the strip for shifting said pawl holding means from coactive relation with one pawl to coactive relation with the other pawl when one spool is full.

In witness whereof, I have hereunto set my hand this 19th day of October, 1926.

WILLIAM W. HAMEL.